(No Model.)
H. MENDENHALL & J. M. HITE.
POST HOLE AUGER.
No. 468,812. Patented Feb. 16, 1892.
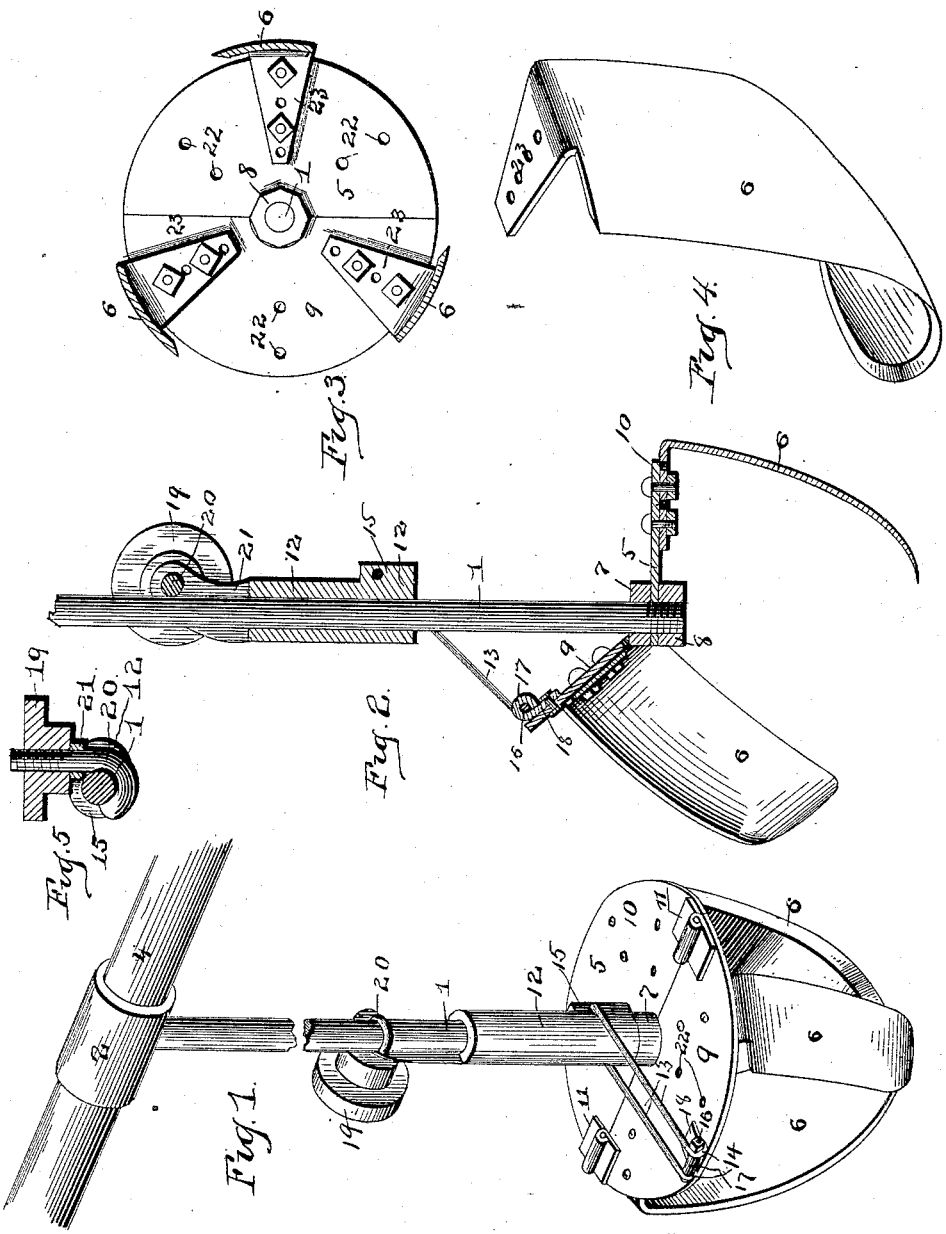
Witnesses
H. G. Seitz
H. J. Riley
Inventors
Hiram Mendenhall
John M. Hite
By their Attorneys, C. A. Snow & Co.

UNITED STATES PATENT OFFICE.

HIRAM MENDENHALL AND JOHN M. HITE, OF AUDUBON, IOWA.

POST-HOLE AUGER.

SPECIFICATION forming part of Letters Patent No. 468,812, dated February 16, 1892.

Application filed June 16, 1891. Serial No. 396,500. (No model.)

*To all whom it may concern:*

Be it known that we, HIRAM MENDENHALL and JOHN M. HITE, citizens of the United States, residing at Audubon, in the county of Audubon and State of Iowa, have invented a new and useful Post-Hole Auger, of which the following is a specification.

This invention relates to improvements in post-hole augers.

The object of the present invention is to improve and increase the efficiency of post-hole augers and to enable them to be readily adjusted to vary the size of the hole and to render them capable of removing the loose dirt from the hole.

The invention consists in the construction and novel combination and arrangement of parts hereinafter fully described, illustrated in the accompanying drawings, and pointed out in the claims hereto appended.

In the drawings hereto annexed, Figure 1 is a perspective view of an earth-auger constructed in accordance with this invention. Fig. 2 is a central longitudinal sectional view, the blades of the auger being spread. Fig. 3 is a reverse plan view, the blades being broken away to show the disk. Fig. 4 is a detail view of one of the blades. Fig. 5 is a detail sectional view.

Referring to the accompanying drawings, 1 designates a rod or stem, which is provided at one end with a socket or sleeve 2, adapted to receive a handle 4, and the other end of the stem is threaded and has secured to it a disk 5, which carries blades 6 and which is provided with a central opening and is secured to the threaded end by means of a ring 7 and a nut 8. The blades 6 are inwardly inclined and have their ends curved inward, and are adapted to hold the loose dirt and to remove the same from a hole when the auger is lifted out and to enable the dirt, which may sometimes be sticky and adhere to the blades, to be readily deposited. The disk is provided with a hinged section 9, which is adapted to be swung inward toward the stem or rod to spread or separate the blades. The section 9 of the disk is semicircular and is attached to the rigid portion 10 by hinges 11, and it is operated by a sliding sleeve 12, which is arranged on the rod 1 and is connected with the hinged section 9 by a link 13. The link 13 is U-shaped and is provided at its end with eyes 14, and its bend engages a perforated lug 15 at the outer end of the sleeve, and the eyes 14 engage a pivot 16, which passes through an eye 17 of a plate 18 and projects from opposite sides of the same. The hinged section 9 is secured in operative position by a thumb-nut 19, which engages the threaded shank of the hook 20, and the latter is arranged in a perforation of an extension 21 of the sleeve and the hook engages the rod on the side opposite the extension.

It has been found convenient to employ from three to six blades, and the disk 4 is provided with a series of perforations 22, through which pass bolts to secure the blades and which enable the number of blades to be varied, as may be found necessary, and also enable the position of the blades to be changed as desired. By this construction the blades may be adjusted outward or radially and around the disk or circumferentially. The inner ends of the blades are provided with flanges 23, which are arranged on the disk and have each a longitudinally-disposed series of perforations that permit the blades to be adjusted to vary the size of the hole.

It will be seen that the auger is simple and comparatively inexpensive in construction and is adapted to be readily adjusted to vary the size of the hole to be dug and is capable of conveniently removing the loose dirt and of readily depositing the same to clean the blades.

What we claim is—

1. In an auger, the combination of the stem, the disk secured to the stem and having a hinged section, the blades carried by the disk, a sleeve arranged on the stem and provided at its outer end with a perforation and at its inner end with an extension, a link engaging the perforation and connecting the sleeve and the hinged section, the hook arranged in a perforation of the extension and engaging the stem and having a threaded shank, and a thumb-nut engaging the threaded shank and securing the sleeve rigidly to the stem at any point of adjustment, substantially as described.

2. In an auger, the combination of the stem, the disk secured to the stem and having a hinged section, the radially and circumferentially adjustable blades carried by the disk, and means for operating the hinged section to spread the blades, substantially as described.

In testimony that we claim the foregoing as our own we have hereto affixed our signatures in presence of two witnesses.

HIRAM MENDENHALL.
JOHN M. HITE.

Witnesses:
A. F. ARMSTRONG,
J. M. HART.